US009225455B2

(12) United States Patent
Yu et al.

(10) Patent No.: US 9,225,455 B2
(45) Date of Patent: Dec. 29, 2015

(54) DIGITAL NON-LINEAR COMPENSATION IN OPTICAL COMMUNICATION SYSTEMS

(71) Applicant: ZTE (USA) Inc., Morristown, NJ (US)

(72) Inventors: Jianjun Yu, Basking Ridge, NJ (US); Junwen Zhang, Morristown, NJ (US)

(73) Assignee: ZTE (USA) Inc., Austin, TX (US)

( * ) Notice: Subject to any disclaimer, the term of this patent is extended or adjusted under 35 U.S.C. 154(b) by 24 days.

(21) Appl. No.: 14/154,959

(22) Filed: Jan. 14, 2014

(65) Prior Publication Data
US 2014/0199076 A1    Jul. 17, 2014

Related U.S. Application Data

(60) Provisional application No. 61/752,946, filed on Jan. 15, 2013.

(51) Int. Cl.
*H04J 14/02*       (2006.01)
*H04B 10/2543*     (2013.01)
*H04B 10/61*       (2013.01)

(52) U.S. Cl.
CPC ............ *H04J 14/02* (2013.01); *H04B 10/2543* (2013.01); *H04B 10/6163* (2013.01)

(58) Field of Classification Search
CPC ........... H04B 10/2507; H04B 10/2543; H04B 10/255; H04B 10/2557; H04B 10/2563; H04B 10/6163; H04J 14/02
USPC .................................. 398/159, 158, 81, 147
See application file for complete search history.

(56) References Cited

U.S. PATENT DOCUMENTS 7,558,479 B1 *   7/2009  Robinson ......................... 398/28
8,805,209 B2 *   8/2014  Li et al. .......................... 398/208

OTHER PUBLICATIONS

Asif, R., et al., "Logaritjmic Step-Size based Digital Backward Propagation in N-channel 112Gbit/s/ch DP-QPSK Transmission," 13th International Conference on Transparent Optical Networks (ICTON), Stockholm, Sweden, Paper Tu.P.6, pp. 1-4, Jun. 2011.
Bosco, G., et al., "Suppression of Spurious Tones Induced by the Split-Step Method in Fiber Systems Simulation," IEEE Photonics Technology Letters, 12(5):489-491, May 2000.
Du, L.B., et al., "Practical XPM Compensation Method for Coherent Optical OFDM Systems," IEEE Photonics Technology Letters, 22(5):320-322, Mar. 2010.
Ho, K.-P., et al., "Electronic Compensation Technique to Mitigate Nonlinear Phase Noise," Journal of Lightwave Technology, 22(3):779-783, Mar. 2004.
Ip, E., "Nonlinear Compensation Using Backpropagation for Polarization-Multiplexed Transmission," Journal of Lightwave Technology, 28(6):939-951, Mar. 2010.
Ip, E., et al., "Compensation of Dispersion and Nonlinear Impairments Using Digital Backpropagation," Journal of Lightwave Technology, 26(20):3416-3425, Oct. 2008.

(Continued)

*Primary Examiner* — M. R. Sedighian
(74) *Attorney, Agent, or Firm* — Perkins Coie LLP

(57) ABSTRACT

Systems, devices and techniques for processing an optical signal transmitted from a source over a transmission medium having a length L and performing compensation of non-linear distortions include formulating the compensation as a digital back propagation algorithm by logically dividing the length L into N steps and compensating non-linear distortions for each step as a function of an attenuation adjusting constant parameter that can be selected from a range between 0.3 and 0.7.

20 Claims, 15 Drawing Sheets

(56) References Cited

OTHER PUBLICATIONS

Ip, E., et al., "Fiber Impairment Compensation Using Coherent Detection and Digital Signal Processing," Journal of Lightwave Technology, 28(4):502-519, Feb. 2010.

Li, J., et al., "Sepctrally Efficient Quadrature Duobinary Coherent Systems With Symbol-Rate Digital Signal Processing," Journal of Lightwave Technology, 29(8):1098-1104, Apr. 2011.

Li, X., et al., "Electronics post-compensation of WDM transmisison impairments using coherent detection and digital signal processing," Optics Express, 16(2):880-888, Jan. 2008.

Lin, C.-Y., et al., "Step-size selection for split-step based nonlinear compensation with coherent detection in 112-Gb/s 16-QAM transmission," Chinese Optics Letters, 10(2):020605(1-3), Feb. 2012.

Mateo, E.F., et al., "Efficient compensation of inter-channel nonlinear effects via digital backward propagation in WDM optical transmission," Optics Express, 18(14):15144-15154, Jul. 2010.

Mateo, E.F., et al., "Improved digital backward propagation for the compensation of inter-channel nonlinear effects in polarization-multiplexed WDM systems," Optics Express, 19(2):570-583, Jan. 2011.

Roberts, K., et al., "Electronic Precompensation of Optical Nonlinearity," IEEE Photonics Technology Letters, 18(2):403-405, Jan. 2006.

Sinkin, O.V., et al., "Optimization of the Split-Step Fourier Method in Modeling Optical-Fiber Communications Systems," Journal of Lightwave Technology, 21(1):61-68, Jan. 2003.

Yaman, F., et al., "Nonlinear Impairment Compensation for Polarization-Division Multiplexed WDM Transmission Using Digital Backward Propagation," IEEE Photonics Journal, 1(2):144-152, Aug. 2009.

Yaman, F., et al., "Nonlinear Impairment Compensation for Polarization-Division Multiplexed WDM Transmission Using Digital Backward Propagation," IEEE Photonics Journal, 2(5):816-832, Oct. 2010.

Yu, J., et al., "7-Tb/s (7×1.284 Tb/s/ch) Signal Transmission Over 320 km Using PDM-64QAM Modulation," IEEE Photonics Technology Letters, 24(4):264-266, Feb. 2012.

Zhang, F., et al., "Experimental Comparison of Different BER Estimation Methods for Coherent Optical QPSK Transmission Systems," IEEE Photonics Technology Letters, 23(18):1343-1345, Sep. 2011.

Zhang, J., et al., "Multi-modulus Blind Equalizations for Coherent Spectrum Shaped PolMux Quadrature Duobinary Signal Processing," Optical Fiber Communication Conference/National Fiber Optic Engineers Conference (OFC/NFOEC) 2013, Anaheim, California, USA, OSA Technical Digest (online), Optical Society of America, Paper OW4B.4, pp. 1-3, Mar. 2013.

Zhang, S., et al., "40×117.6 Gb/s PDM-16QAM OFDM Transmission over 10,181 km with Soft-Decision LDPC Coding and Nonlinearity Compensation," Optical Fiber Communication Conference/National Fiber Optic Engineers Conference (OFC/NFOEC) 2012, Los Angeles, California, USA, OSA Technical Digest (online), Optical Society of America, Paper PDP5C.4, pp. 1-3, Mar. 2012.

Zhou, X., et al., "Multi-Level, Multi-Dimensional Coding for High-Speed and High-Spectral-Efficiency Optical Transmission," Journal of Lightwave Technology, 27(16):3641-3653, Aug. 2009.

\* cited by examiner

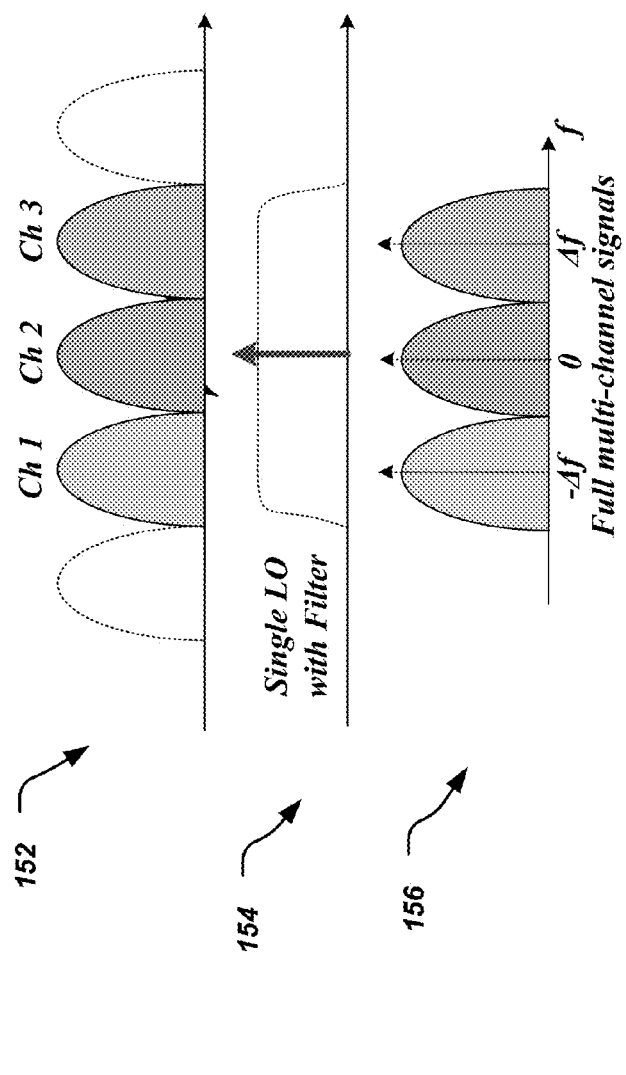
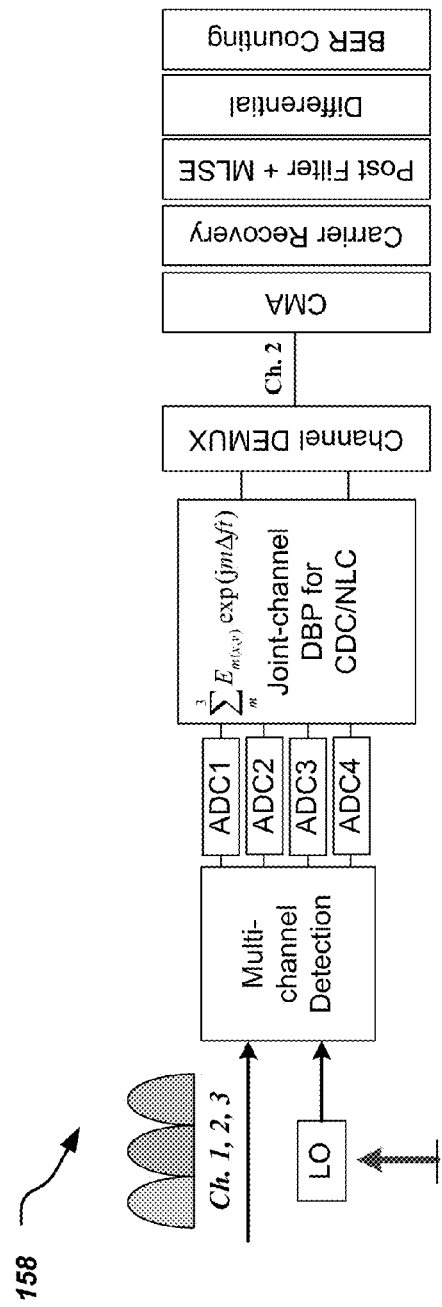

DIGITAL NON-LINEAR COMPENSATION IN OPTICAL COMMUNICATION SYSTEMS

CROSS REFERENCE TO RELATED APPLICATIONS

This patent document claims the benefit of priority of U.S. Provisional Patent Application No. 61/752,946, filed on Jan. 15, 2013. The entire content of the before-mentioned patent application is incorporated by reference herein.

TECHNICAL FIELD

This patent document relates to optical communications and techniques for recovering data from optical signals.

BACKGROUND

With the advent of transmission of multimedia content such as video over the Internet and other communications networks, there is any ever-increasing need for increased data rate capacity on communication networks. Often, optical communication signals are used in backbones of communications network, where the increased traffic at the edges of the network aggregates to several gigabit of network traffic. Therefore, there is an increasing need for optical communication techniques to meet the demand on communications network data capacity. However, laying down additional optical transmission media such as fiber optics often requires large amount of capital expenditure and may not always be a suitable options due to the expenses involved and other regulatory issues.

Techniques for improved optical transceiver operation are needed.

SUMMARY

This patent document provides, among others, techniques for performing compensation to reduce or eliminate non-linear artifacts in a received optical communication signal. The disclosed techniques can be used to receive wavelength division multiplexed multiple optical communication channels.

In one aspect, methods, apparatus and computer program products for optical signal processing include techniques for receiving, at a receiver, an optical signal transmitted from a source over a transmission medium having a length L, the optical signal comprising a plurality of wavelength division multiplexed (WDM) optical channels, processing the optical signal to jointly compensate non-linear distortions in the plurality of WDM optical channels using an iterative digital back propagation (DBP) algorithm by dividing the length L into N steps, where N is an integer and wherein operation of the DBP algorithm at each step is controlled by a corresponding step size of the step, selecting step sizes of N steps as a function of a distance from the source such that for a first set of contiguous steps starting from the receiver and extending towards the source, selected step sizes have values greater than L/N and less than values from logarithmic step size assignments and for remaining steps not in the first set, selected step sizes have values smaller than L/N and greater than values from logarithmic step size assignments.

In another aspect, methods, apparatus and computer program products for implementing an optical receiver that receives an optical signal transmitted from a source over a transmission medium having a length L, the optical signal comprising a plurality of wavelength division multiplexed (WDM) optical channels having undergone non-linear distortions, a distortion compensator that processes the optical signal to jointly compensate non-linear distortions in the plurality of WDM optical channels using an iterative digital back propagation (DBP) algorithm by dividing the length L into N steps and a step size controller that controls a step size used for calculation at each of the N steps as a function of a distance from the source, a fibre loss parameter and a attenuation adjusting factor that has a constant value are disclosed.

This and other aspects and their implementations are described in greater detail in the drawings, the description and the claims.

BRIEF DESCRIPTION OF DRAWINGS

FIGS. 1A and 1B depict spectrum of an example optical signal for multi-channel detection for joint-channel NLC, and the block diagrams of described JC-NLC and CDC based on DBP method, channel DEMUX and following equalizations, respectively.

DETAILED DESCRIPTION

Figure 2:
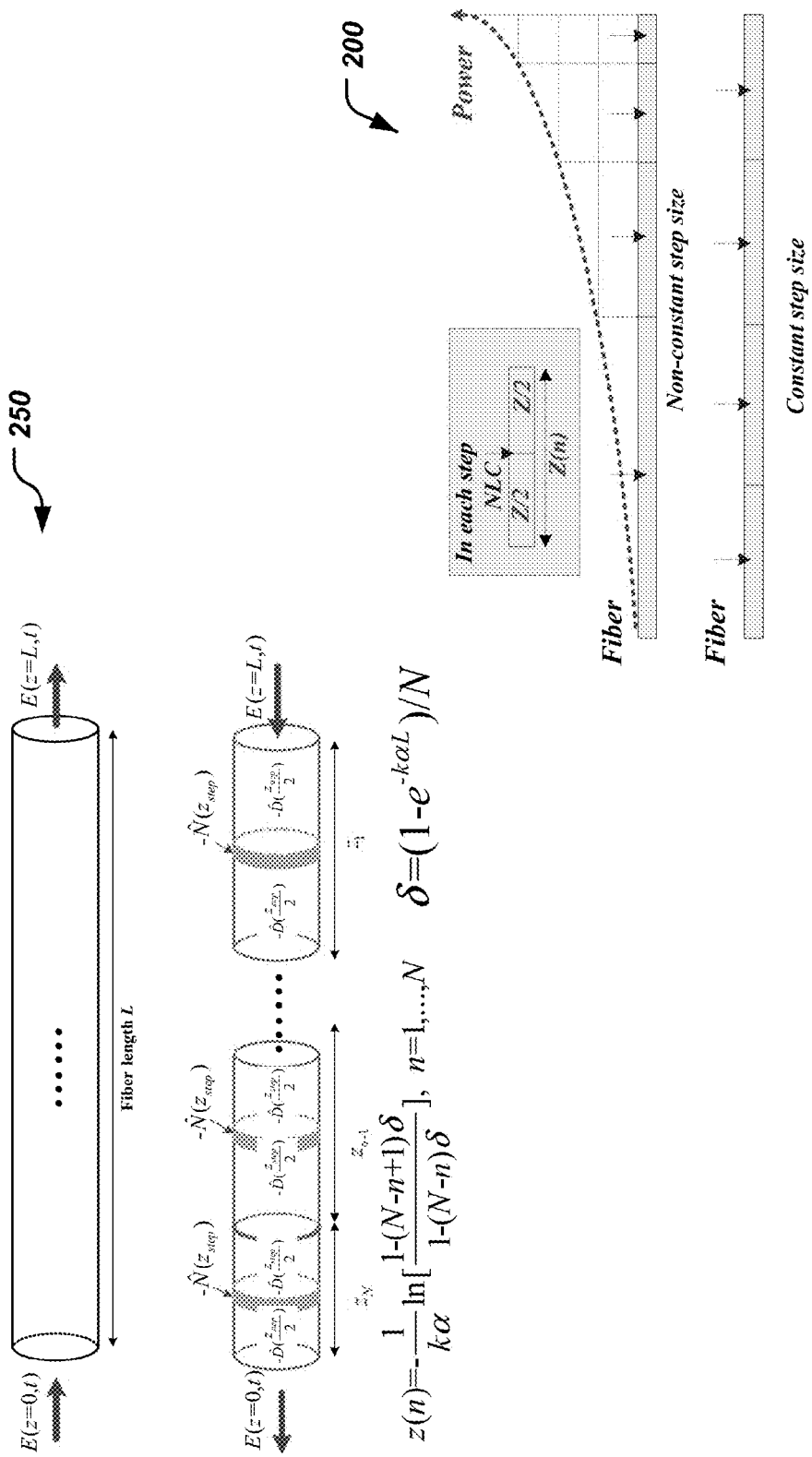
FIG. 2 is an illustrative drawing of NLC based on constant and non-constant logarithmic step size. The red-dashed curve shows the power distribution in the fiber span; the blue arrows show the nonlinear operation in each step.

The techniques disclosed in the present document can be used to improve the performance of an optical signal receiver. The disclosed techniques can be incorporated in calculations performed at the optical signal receiver for reducing or eliminating non-liner distortions caused in the received signal during communication over a fibre optical medium. The distortions may be a result of various effects such as self-phase modulation, cross-phase modulation, etc. The techniques disclosed in the present document can also be used to control a receiver signal processing algorithm from being a full logarithmic algorithm to being a constant step-size algorithm, simply by varying a single parameter. Non-linear degradations in a received optical signal can be compensated using the disclosed techniques. The compensation can be performed in the digital domain, using high speed digital circuitry of processor implemented techniques. The compensated signal can then be demodulated and data can be recovered from the signal.

In some disclosed embodiments, a joint-channel digital backward propagation (DBP) nonlinear compensation (JC-NLC) for Nyquist wavelength division multiplexing (NWDM) system is based on the optimal logarithmic step size. By using multi-channel coherent detection, an implementation can obtain the total multi-channel signals simultaneously, which can be processed by the JC-NLC based on DBP using a split-step Fourier method. Different from regular constant step size, we disclose the logarithmic non-constant step size distribution in DBP with reduced complexity and improved performance. The optimal logarithmic step size distribution is obtained by introducing an attenuation adjusting factor k. Compared with individual-channel constant step nonlinear compensation, the improved bit-error-ratio (BER) performance and Q-value for our scheme is demonstrated by 3×50-Gb/s NWDM polarization division multiplexing quadrature phase shift keying (PDM-QPSK) signal with 1120-km single-mode fiber-28 (SMF-28) transmission and Erbium-doped fiber amplifier (EDFA)-only amplification.

Nonlinear compensation (NLC) by using digital signal processing (DSP) has become an attractive research topic these years for long-haul high speed coherent transmission system. Digital backward propagation (DBP), based on slip-step Fourier method (SSFM) by backward solving the non-linear Schrodinger equation (NLSE), has been proved as an effective way to compensate for the nonlinear effect including self-phase modulation (SPM), cross-phase modulation (XPM) and four-wave mixing (FWM). In previous work, the DBP method has been theoretically and experimentally demonstrated for single channel polarization division multiplexing (PDM) system by using an improved NLSE. For WDM system with inter-channel nonlinear effects, a clock-synchronized detection and fully-reconstructed multi-channel signal may show better NLC performance. In some systems, the NLC for PDM WDM system is performed by DBP method using multi-channel signals. Some systems use the multi-band nonlinear impairment compensation for PDM orthogonal frequency-division multiplexing (OFDM) signal by using wide bandwidth detection, where the multi-band signals are detected once at the same time.

The above-discussed DBP techniques are implemented with constant step-size SSFM, where the step size has the same value in each SSFM computation and the performance of NLC is significantly dependent on the computational step-size or step number for each span fibre. Thus, reducing the number of DBP calculation steps per fiber span is an effective way to reduce computations of the algorithm. On the other hand, others have also proposed the non-constant step size in forward simulation to enhance the accuracy in estimation of signal distortions compared with constant step-size distribution. It has also been demonstrated that a logarithmic non-constant step-size distribution can reduce the step number while keeping the same performance in individual intra-channel NLC. However, the optimal logarithmic step size distribution has not been used and the performance for inter-channel NLC in multi-channel system has not been discussed. Also, the inter-channel NLC is not known for Nyquist wavelength division multiplexing (NWDM) system, which is more sensitive to inter-channel nonlinear impairment due to the high spectral efficiency and channel spacing equal to baud rate.

In this document, we disclose and demonstrate, via experimental results, superiority of the joint-channel DBP nonlinear compensation (JC-NLC) for NWDM system based on the optimal logarithmic step size. The sub-channels in NWDM system are more compact in bandwidth which enables the multi-channel coherent detection. By using multi-channel coherent detection, embodiments can simultaneously obtain the total multi-channel signals which can be processed by the JC-NLC based on DBP using SSFM. Different from regular constant step size, embodiments can use the logarithmic non-constant step size distribution in DBP with reduced complexity and improved performance. An optimal logarithmic step size distribution can be achieved by introducing an attenuation adjusting factor k. Simulation and experiment results shows the optimal k factor is around 0.4. Compared with individual-channel constant step NLC, the improved bit-error-ratio (BER) performance and Q-value for our scheme is demonstrated by 3×50-Gb/s NWDM polarization division multiplexing quadrature phase shift keying (PDM-QPSK) signal with 1120-km single-mode fiber-28 (SMF-28) transmission with Erbium-doped fiber amplifier (EDFA)-only amplification.

This document discloses the JC-NLC based on optimal logarithmic step size and corresponding simulation results. An experimental setup and demonstration by the 3×50-Gb/s NWDM PDM-QPSK signal with 1120-km SMF-28 transmission with EDFA-only amplification is also disclosed.

Figure 13:
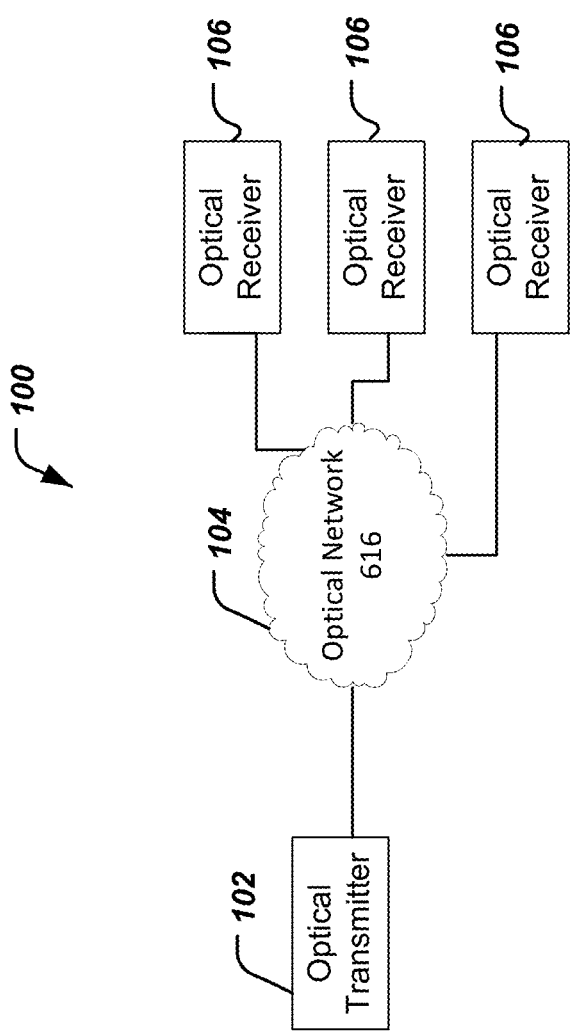
FIG. 13 is a block diagram of an optical communications system.

FIG. 13 is a block diagram representation of an optical communication system 100 where the subject technology of this document can be implemented. An optical transmitter 102 transmits and receives optical signals through an optical network 104 to/from one or more optical transceivers 106. The transmitted optical signals may go through intermediate optical equipment such as amplifiers, repeaters, switch, etc., which are not shown in FIG. 13 for clarity. An optical signal transmitted from the transmitter 102 may undergo non-linear distortions prior to being received at the transceiver 106. Various signal recovery techniques can be implemented at the transceivers 106, e.g., as described below.

FIG. 1A shows an example spectrum occupancy of a communication signal used in a multi-channel detection for joint-channel NLC. Three channels Ch1, Ch2, and Ch3 are depicted (152), each having a fixed bandwidth $\Delta f$ and separated by $\Delta f$. For NWDM system, the channel spacing is equal to the baud rate with a high spectral efficiency. The inter-channel nonlinear impairments such as XPM and FWM are stronger for these sub-channels. However, based on the broadband multi-channel detection, it enables the compensation of inter-channel effects such as XPM and FWM. Take a multi-channel NWDM signal as an example. For regular individual channel detection, these channels are detected and processed independently. Thus, only intra-channel impairments such as chromatic dispersion (CD) and SPM can be compensated. However, when we consider the multi-channel coherent detection (here we show three-channel detection), one local oscillator (LO) with a three-channel bandwidth filter (154), which is centered at the centre frequency of channel 2, is used to coherent detect the three sub-channels (156). The analog-to-digital converter (ADC) bandwidth is large enough for these three sub-channels. Full information of these channels is obtained. Thus, the multi-channel signals are detected simultaneously and can be jointly processed. Especially, because the two side-channel information for channel 2 is available, cross-channel nonlinear impairments, such as nonlinear XPM, cross-polarization modulation (XPolM) and FWM, can be compensated together based on joint-channel DBP method.

FIG. 1B shows the block diagram 158 of an example of the disclosed multi-channel detection receiver and DSP with JC-NLC and CD compensation (CDC), channel de-multiplexing and following equalizations. The received multi-channel signals are detected and sampled by four ADCs to obtain the digital signals with full channel information. JC-NLC and CDC is first applied on received signals based on DBP method by the solving of multi-channel coupled NLSEs. In some implementations, an improved DBP method for PDM WDM system is used, which can be realized by solving Manakov function as:

$$\frac{\partial E_{x,y}}{\partial z} = \qquad\qquad\qquad\text{Eq. (1)}$$
$$-\frac{\alpha}{2}E_{x,y} + \frac{\beta_2}{2}\frac{\partial^2 E_{x,y}}{\partial t^2} - \frac{\beta_3}{6}\frac{\partial^3 E_{x,y}}{\partial t^3} + i\frac{8}{9}\gamma(|E_{x,y}|^2 + |E_{y,x}|^2)E_{x,y},$$

where $E_{x,y}$ is the multi-channel optical field of X- or Y-polarization signal, $\beta i$ is the i-order dispersion, $\alpha$ is the fibre loss, $\gamma$ is the nonlinear parameter and z is the step fibre length. For three-channel signals, we have the total signal as $$E_{x,y} = \sum_{m=1}^{3} E_{m(x,y)}\exp(jm\Delta f t) \qquad\text{Eq. (2)}$$

where $E_m(x,y)$ is the optical filed of the $m^{th}$ channel and $\Delta f$ is the channel spacing. By using SSFM, the receiver compensate for the fibre CD and nonlinear impairments by backward solving the above-mentioned function. During each step length z, we first compensate for the CD and fiber loss for the first z/2 step length in the frequency domain. Then, embodiments may calculate and compensate for the nonlinear phase shift in the time domain. Finally, the CD and loss of the second z/2 step length is compensated again in the frequency domain.

As mentioned above, Eq. 1 includes intra-channel and cross-channel nonlinear impairments between channels and polarization components. After JC-NLC and CDC, the three-channel signals are de-multiplexed in the electrical domain and down-converted to baseband by frequency shifting. The channel demultiplexing can be realized by using digital filter such as a Bessel filter. Then each sub-channel is processed by subsequent DSP, including polarization de-multiplexing based on constant modulus algorithm (CMA), frequency offset estimation and phase recovery. After carrier recovery, a digital delay-and-add post filter is used to provide a simple way to achieve partial response, which can effectively mitigate the inter-channel crosstalk and intra-channel noise introduced by adaptive equalizer. As a result of the delay-and-add effect, the 2-ary amplitude shift keying (2-ASK) I and Q components disappear and are then independently converted into two 3-ASK symbol series. Therefore, adoption of the post filter also makes possible the use of multi-symbol optimal decision schemes, such as maximum likelihood sequence estimation (MLSE), to take advantage of symbol correlation existing in the received partial response signals. Here, the receiver can use MLSE with a 1-bit memory length to realize further error correction induced by inter-symbol interference (ISI). Before the BER is counted for the three channels, differential decoding is applied.

Assuming the fibre length per span is L and the number of steps of DBP calculation per span is N. As shown in graph 200 and diagrammatically depicted in 250 of FIG. 2, for regular DBP method based on SSFM, a constant step size z is used and the step size is equal in each SSFM computation as z(n)=L/n. In this way, the performance of NLC is significantly dependent on the computational step-size or step number for each span fibre. Thus, reducing the number of DBP calculation steps per fibre span is an effective way to reduce the computations of the algorithm. However, in a practical fibre optic medium, the power has a non-linear distribution. The power is larger at the propagation-side (right hand side in graph 200) beginning with stronger nonlinear impairments, which becomes much smaller at the other end (left hand side in graph 200) as shown in FIG. 2. Thus, a smaller step size could be used for the larger power to enhance the accuracy in estimation of signal distortions. Alternatively, non-constant logarithmic step-size distribution, where the step size decreases as power increases, can also be used for the forward propagation simulation to avoid the over-estimated production of spurious FWM peaks by constant step-size methods.

In some embodiments, the logarithmic step size equations with an attenuation adjusting factor k from the fibre end to the front (e.g., from the left side of FIG. 2 to the right side of FIG. 2) as follows:

$$z(n) = -\frac{1}{k\alpha}\ln\left[\frac{1-(N-n+1)\delta}{1-(N-n)\delta}\right], n = 1, \dots, N \qquad\text{Eq. (3)}$$

where $\delta=(1-e^{-k\alpha L})/N$. Here, z(n) is the nth step size in DBP, and $\alpha$ is the fibre loss. Thus, by adjusting the factor k, the optical receiver can change the step size distribution in the DBP calculation. However, the factor k only impacts the step size distribution. In other words, for different k values, the fibre loss is not changed in the DBP computation. The reason of introducing an adjusting factor k can be explained by the following analysis.

When k=1, the z(n) is similar to the backforward full logarithmic distribution. When k approaches 0, the logarithmic step size distribution becomes constant step size as:

$$\lim_{k\to 0} z(n) = \lim_{k\to 0}\left\{-\frac{1}{k\alpha}\ln\left[\frac{1-(N-n+1)\delta}{1-(N-n)\delta}\right]\right\} = L/N, \qquad\text{Eq. (4)}$$
$$n = 1, \dots, N$$

Thus, the k value (from 0 to 1) changes the step size distribution between the constant and full logarithmic step size.

Figure 3:
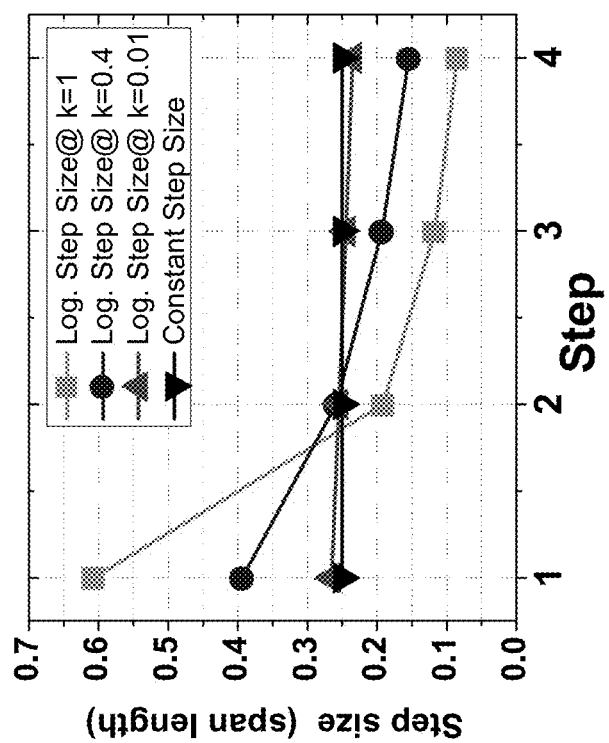
FIG. 3 is a graph showing relationship between step size of each step for constant step size and logarithmic step size distribution under different adjusting factor k when the step number is set at 4.

FIG. 3 shows the step size of each step (or leg) in the calculation span under different adjusting factor k for LS distribution as well as the constant step size distribution. Here, we use 4 steps each span. For constant step size distribution, the step size of each step is 0.25 L; however, when using LS distribution, the step size is non-constant. When k gets larger, the step difference between the first step and the following steps also gets larger. When k approaches 0, the logarithmic step size distribution approaches constant step size as shown as in FIG. 3 when k=0.01. The case of k=1 is just the case for the logarithmic power distribution, where the first step size is larger than 0.6 L and the last one is less than 0.1 L. In this way, the step size differences are getting larger with the increasing of k value. However, the step difference may be too large for DBP nonlinear compensation since the step number is limited. Also, the amplified spontaneous emission (ASE) noise interaction in DBP can also degrade the accuracy for backward single recovery. Thus, by introducing an adjusting factor k, we can adjust the step size distribution between constant and full logarithmic step size to achieve the optimal performances.

In order to validate the NLC based on disclosed joint-channel logarithmic step size DBP (JC-LS-DBP) method and the impact of k factor on the performance, we simulated the NLC for the three-channel 12.5-Gbaud NWDM PDM-QPSK signal over 10 spans of 100-km SMF with EDFA only based on different processing methods. In our simulation, 3×50-Gb/s NWDM PDM-QPSK signals are carried by three sub-carriers with 12.5-GHz frequency spacing. Each channel carries 1024 QPSK symbols per polarization. Each span of fiber is followed by an EDFA (Erbium doped fibre amplifier), which is ideally gain-controlled with 20-dB gain. The noise figure is set at 4 dB. The fiber loss (alpha) is 0.2 dB/km, CD is 16 ps/km/nm and nonlinear parameter γ is 1.5 W-1 km-1. The Q value is used in the simulation results in FIGS. 4 to 6 for performance comparison. The Q value is calculated as the ratio between the difference of the means and the sum of the standard deviations (STDs) of in-phase (quadrature) components with opposite signs, which has been tested and agrees well with the error counting measurement for system performance estimation.

Figure 4:
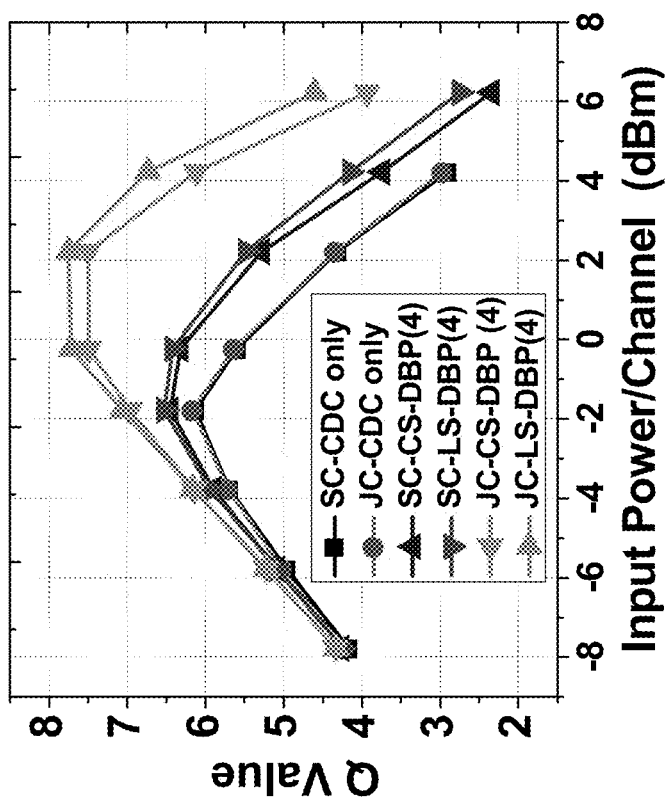
FIG. 4 is a graph showing Q value performance versus fiber input power for different processing schemes over 1000-km transmission.

FIG. 4 shows the Q value performance of channel 2 varying with the input power into each span after 1000-km fiber transmission under different processing schemes, including single channel processing with CDC only (SC CDC only), joint-channel processing with CDC only (JC CDC only), single channel NLC/CDC based on constant step size DBP (SC-CS-DBP), single channel NLC/CDC based on logarithmic step size DBP (SC-LS-DBP), joint-channel NLC/CDC based on constant step size DBP (JC-CS-DBP) and joint-channel NLC/CDC based on logarithmic step size (JC-LS-DBP). For CDC only cases, the frequency domain fiber CD transfer function is used. The input power is simultaneously changed for each span. For single-channel CDC or NLC/CDC, the channel 2 is first de-multiplexed from the three channels and then be processed by the single-channel NLC with only channel 2, which is just the case of single channel signal processing. However, for joint-channel NLC and CDC, the three channels are first compensated together and then de-multiplexed, processed as shown in FIG. 1B. The number of steps in the DBP calculation in FIG. 4 under different schemes of single-channel NLC and joint-channel NLC is 4 and the adjusting factor k for logarithmic step size DBP is 0.4.

Several conclusions can be made from FIG. 4. First, compared with CDC-only schemes for both single-channel and joint-channel, the single-channel NLC/CDC schemes based on CS-DBP or LS-DBP both can improve the BER performance in certain degree. However, the improvement is limited since only intra-channel nonlinear impairment (SPM) is compensated for single-channel processing. Second, a further improvement for joint-channel NLC/CDC schemes can be obtained as shown in FIG. 4. Both JC-CS-DBP and JC-LS-DBP show better performance compared with single channel schemes, since the joint-channel NLC can handle both intra-channel and cross-channel nonlinear impairments. Finally, the logarithmic step size distribution schemes show better performances compared with constant step size schemes in both single-channel and joint-channel processing. In this way, the JC-LS-DBP method shows the best performances among all the NLC processing schemes.

Figure 5:
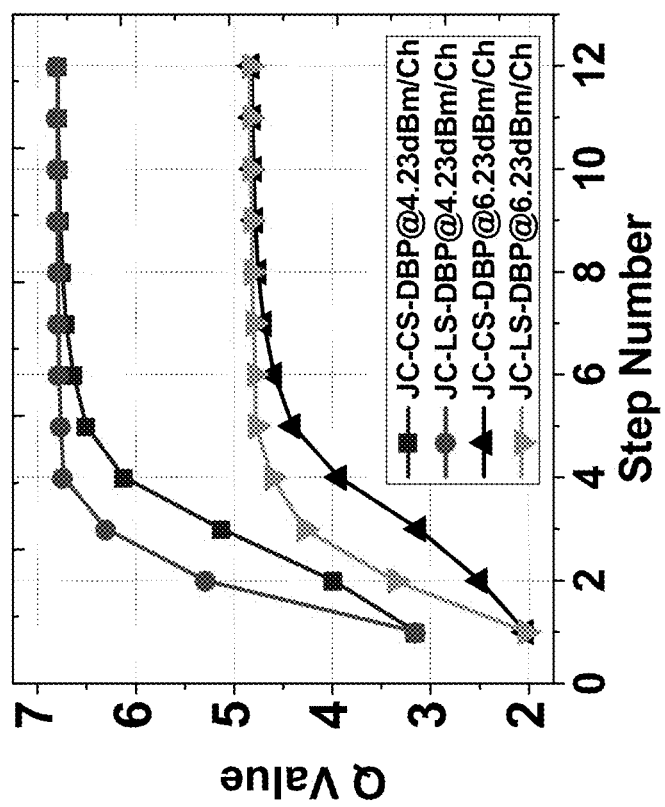
FIG. 5 is a graph showing the Q value performance for joint channel NLC schemes (JC-CS-DBP and JC-LS-DBP) versus the calculation step number per span with different input power.

FIG. 5 shows the computation complexity reduction by logarithmic step size distribution, where the Q performance for joint-channel DBP with constant and logarithmic step size versus the calculation step number per span are presented. The adjusting factor k is kept at 0.4. The Q performance is improved by increasing the calculation step number per span for both constant and logarithmic step size DBP. Increasing the step number per span can improve precision of the nonlinear impairment phase shift during propagation with a smaller step size. The computation complexity is also improved. As the number of DBP steps per fiber span increases to a certain value, the Q value stops decreasing and approaches the maximum value. Thus, there is an optimal step number for different scheme. Using logarithmic step sizes does not outperform the conventional constant step size methods when applying a large number of steps per DBP stage. However, the optimal step number used in LS-DBP can be reduced to nearly half of that in CS-DBP. For 4.23-dBm input power per channel case, the optimal step number is 4 for LS-DBP, while the optimal step number is about 8 for CS-DBP. Therefore, the computation complexity of LS-DPB can be significantly reduced compared with CS-DBP method. For small step number calculation, the LS-DBP method shows better performance compared with CS-DBP under both input power. For different input power, the required optimal step is different. As show in FIG. 5, the number of lower input power (4.23-dBm per channel) is less than that of higher input power (6.23-dBm per channel) for both CS and LS DBP methods. It is because that, more steps are required for higher launch power with larger nonlinear impairments.

Figure 6A:
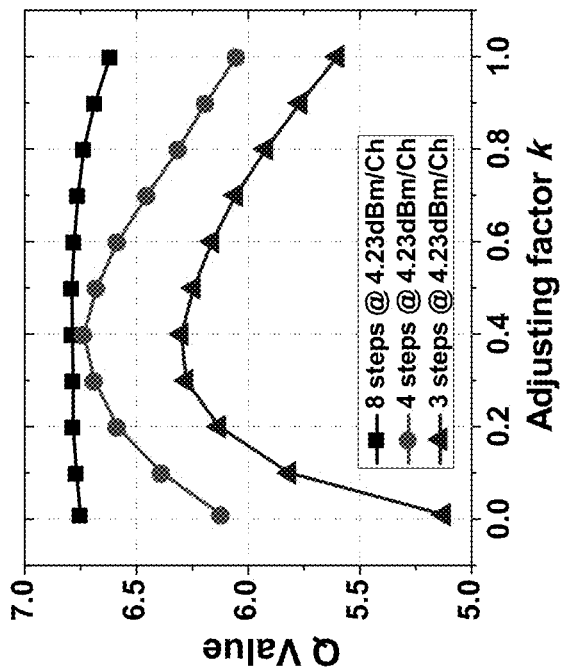
FIGS. 6A-6B are graphs showing the Q value performance of JC-LS-DBP versus the adjusting factor k with different calculation step number at 4.23 and 6.23 dBm/channel, respectively.
Figure 6B:
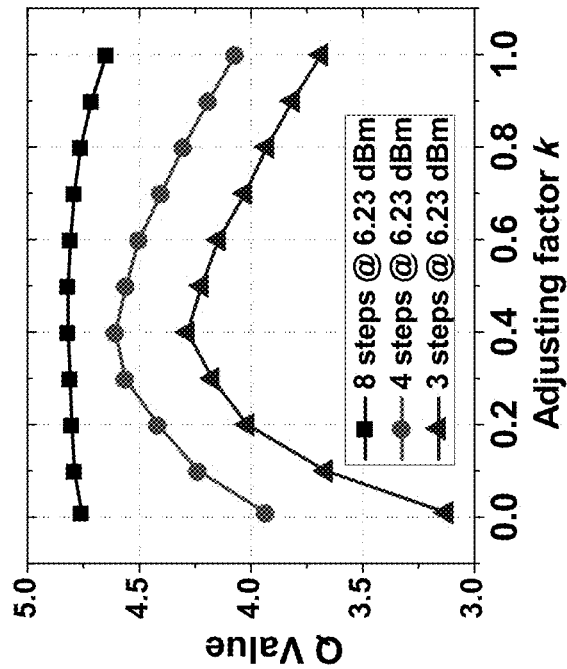

FIGS. 6A and 6B show the impact of adjusting factor k in the JC-LS-DBP calculation on the NLC performance for different step numbers at 4.23 and 6.23 dBm per channel input power, respectively. In the simulation, we change the k factor from 0.01 to 1, where the former makes the step size approaching constant distribution and the latter is full logarithmic distribution. The k factor affects the Q performance for different calculation numbers, especially for smaller calculation step number (3 steps JC-LS-DBP shows larger influence by k as shown in FIGS. 6A-6B). However, the adjusting factor k has less effect for larger calculation step number. On the other hand, the optimal adjusting factor k is around 0.4, which has the best Q performance. Thus, the optimal step size distribution is between the constant (k approaches 0) and full logarithmic cases, which is called the optimal logarithmic step size distribution where k is around 0.4. In general, results with k in the range 0.3 to 0.7 may be acceptable.

Figure 7:
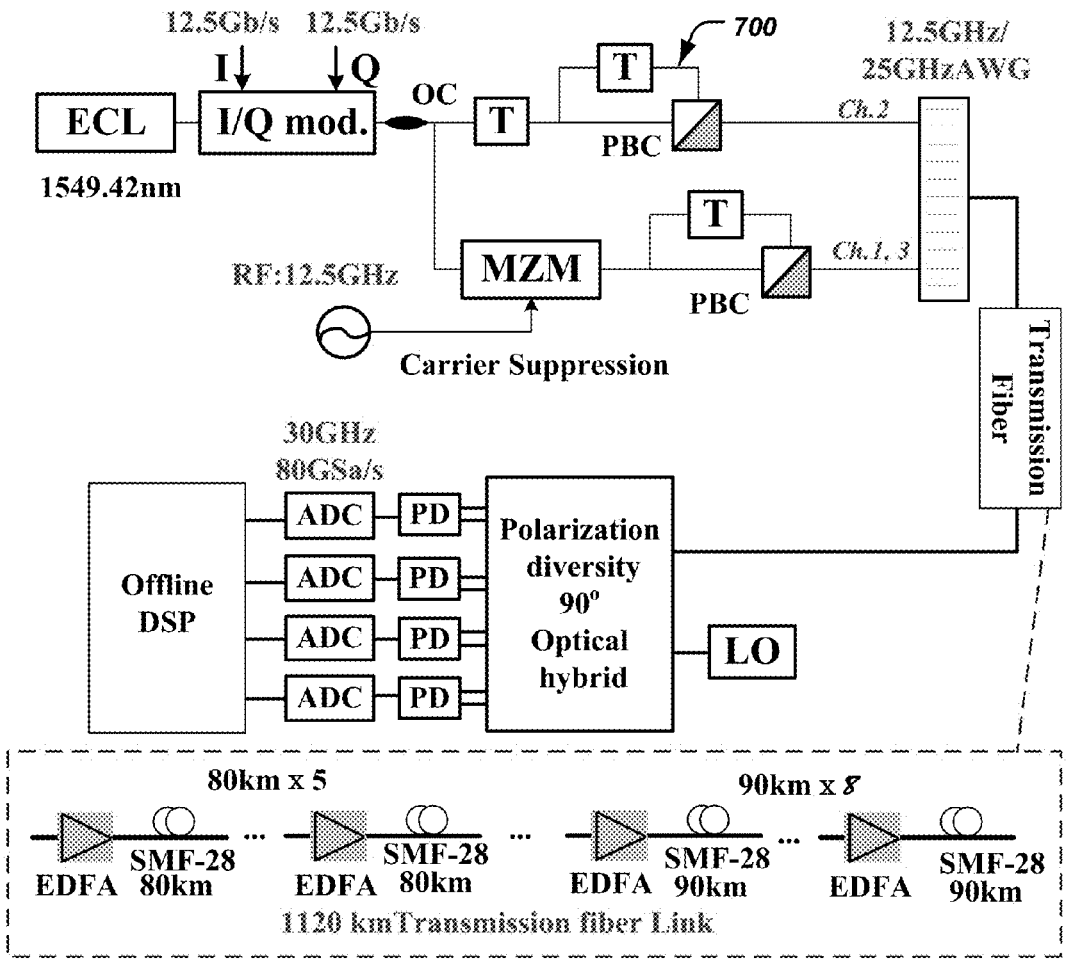
FIG. 7 is a block diagram representation of an experimental setup for 3×50-Gb/s NWDM PDM-QPSK signal over 1120-km SMF-28 with multi-channel detection and joint-channel DSP.

The effectiveness of the disclosed JC-NLC scheme has also been tested in a NWDM PDM-QPSK transmission experiment. FIG. 7 shows a setup 700 for 3×50-Gb/s NWDM PDM-QPSK signal with multi-channel coherent detection over 1120-km SMF-28 transmission and EDFA-only amplification. At the transmitter, one external cavity laser (ECL) at 1549.42 nm is used with the linewidth less than 100 kHz and the output power of 14.5 dBm. For optical QPSK modulation, I/Q modulator is driven by a 12.5-Gbaud electrical binary signal with 0.5Vp-p amplitude and pseudo-random binary sequence (PRBS) length of 211-1. After I/Q modulation, the 25-Gb/s optical QPSK signal is split into two branches. One is for the polarization multiplexing to generate PDM-QPSK signal as channel 2, while the other is injected into a Mach-Zehnder modulator (MZM) for generating the other two odd channels by carrier suppression. The MZM is driven by a 12.5-GHz radio-frequency (RF) signal and biased at null point. The two sidebands of 25-GHz channel spacing are generated as the odd-channel QPSK signal, which is polarization-multiplexed before channel combination. The polarization-multiplexer, which comprises a polarization maintaining optical coupler (OC) to halve the signal, an optical delay line to provide a delay of 150 symbols, and a polarization beam combiner (PBC) to recombine the signal. The odd and even channels are combined by a 12.5/25-GHz arrayed waveguide grating (AWG) before transmission. In this way, a 3×50-Gb/s NWDM PDM-QPSK signal is generated. The straight transmission link consists of 5 spans of 80-km SMF-28 and 8 spans of 90-km SMF-28 with EDFA-only amplification in the absence of optical dispersion compensation. In order to investigate the nonlinear impairment, the output power of each EDFA can be adjusted.

Figure 8B:
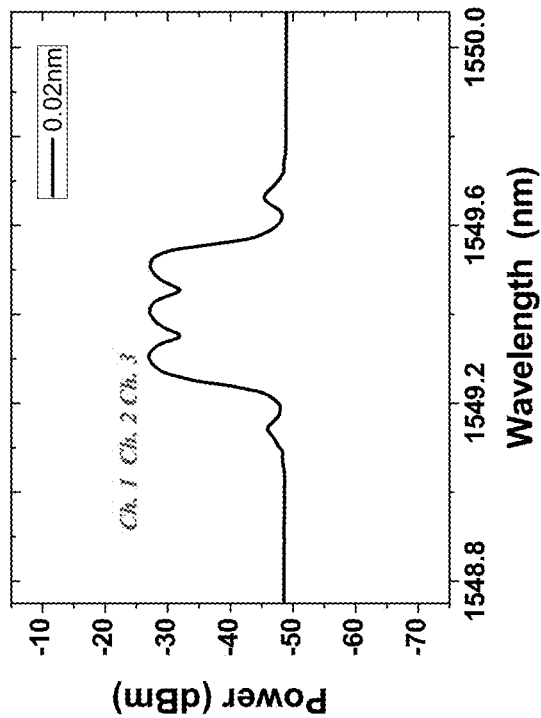
FIGS. 8A-8B depict optical spectrum (0.02-nm resolution) before and after 1120-km transmission, respectively.
Figure 8A:
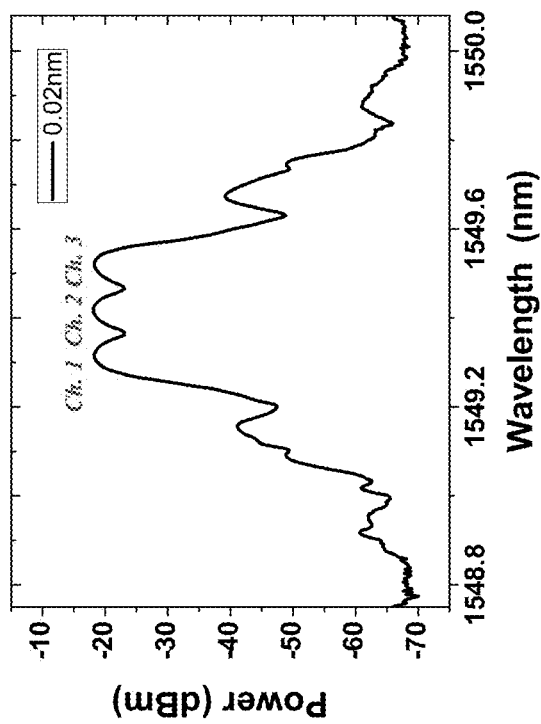

FIGS. 8A and 8B show the optical spectra (0.02-nm resolution) of all channels before and after 1120-km transmission, respectively.

At the coherent receiver, an ECL with linewidth less than 100 kHz is used as the LO, which is at the frequency relative to channel 2. A polarization-diversity 90° hybrid is used for polarization- and phase-diversity coherent detection. The analog-to-digital conversion is realized in the digital scope with 80-GSa/s sample rate and 30-GHz electrical bandwidth. The detailed offline DSP with joint-channel NLC and CDC for received signals after ADCs is shown in FIG. 1B. Firstly, the joint-channel NLC as well as CDC is implemented by DBP method based on the solving of the Manakov function as Eq. 1 with SSFM. The step size for JC-NLC DBP calculation in each span of fiber is non-constant as a logarithmic distribution in Eq. 3. Both CD and nonlinear impairments are compensated together. Here, the average span loss is 0.26 dB/km, CD is 17 ps/km/nm and nonlinear parameter γ is 1.5 W-1 km-1. After joint-channel CDC and NLC, the three-channel signals are de-multiplexed by using a 5-order Bessel filter. Then after the channel demultiplexing, two complex-valued, 13-tap, T/2-spaced adaptive finite-impulse-response (FIR) filters, based on classic CMA, are used to retrieve the modulus of the PDM-QPSK signal and realize polarization de-multiplexing for each sub-channel. The carrier recovery is performed in the subsequent step, where the 4-th power Viterbi-Viterbi algorithm is used for the residual frequency offset estimation and phase recovery. These algorithms can also estimate the slowly-changing dynamic frequency drift. Then, a delay-and-add post filter is adopted to convert the binary signal to the duo-binary one. The final symbol decision is based on 1-bit MSLE. Finally, differential decoding is used to eliminate π/2 phase ambiguity before BER counting for channel 2.

Figure 9:
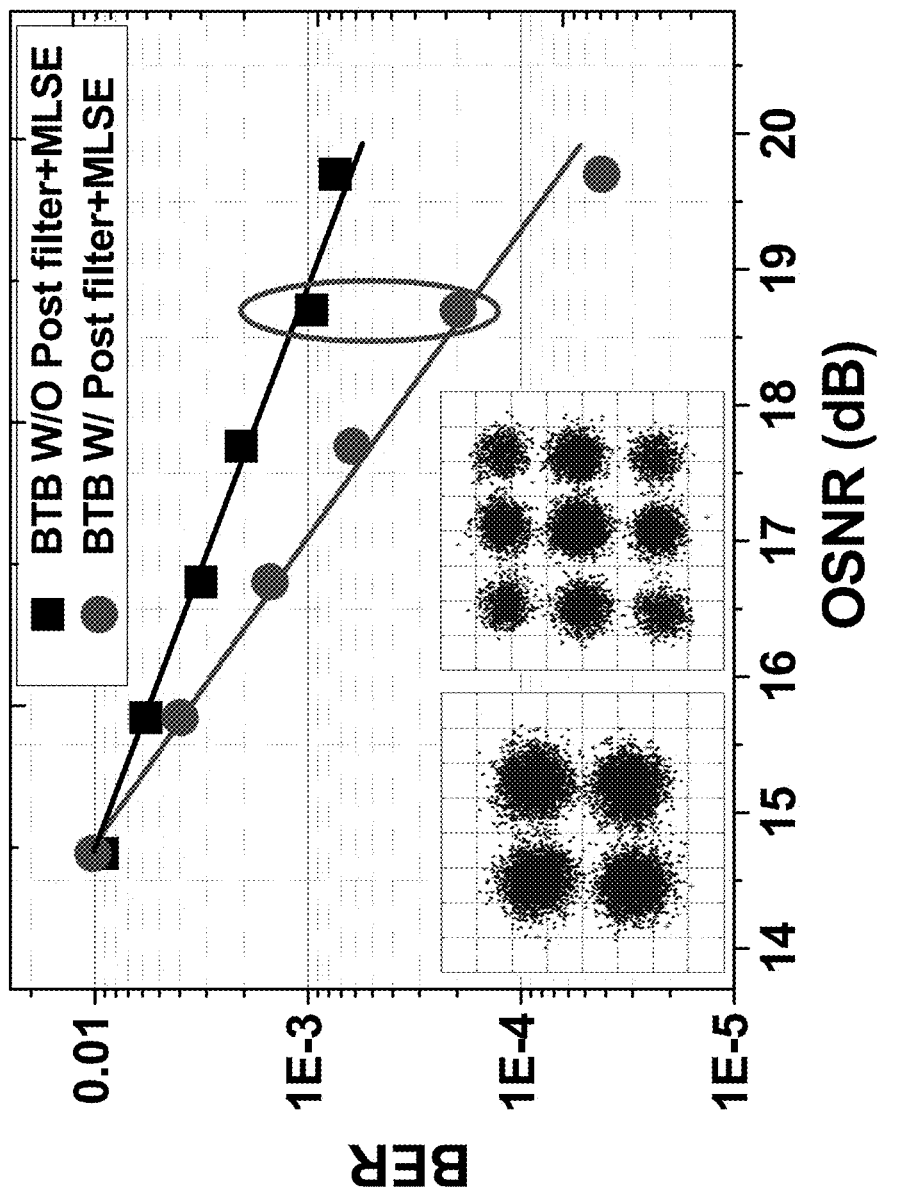
FIG. 9 is a graph depicting the back to back BER performance of channel 2 varying with the OSNR with and without post filter (PF)+MLSE.

FIG. 9 shows an example back to back (BTB) BER of channel 2 in the three-channel NWDM system versus optical signal-to-noise ratio (OSNR) with and without post filter and MLSE, respectively. The constellations of QPSK signal at 18.7-dB OSNR before and after the post filter are inserted in FIG. 9, respectively, showing how the 4-point QPSK signal is shaped into a 9 QAM-like one after post filter. By using post filter and MLSE to suppress the inter-channel crosstalk and ISI, we can obtain about 2-dB OSNR gain for BER at 1×10−3. Thus, the channel 2 signal can be well-recovered with the adjacent sub-channels by multi-channel detection in NWDM system by using post filter and MLSE with channel demultiplexing.

Figure 10:
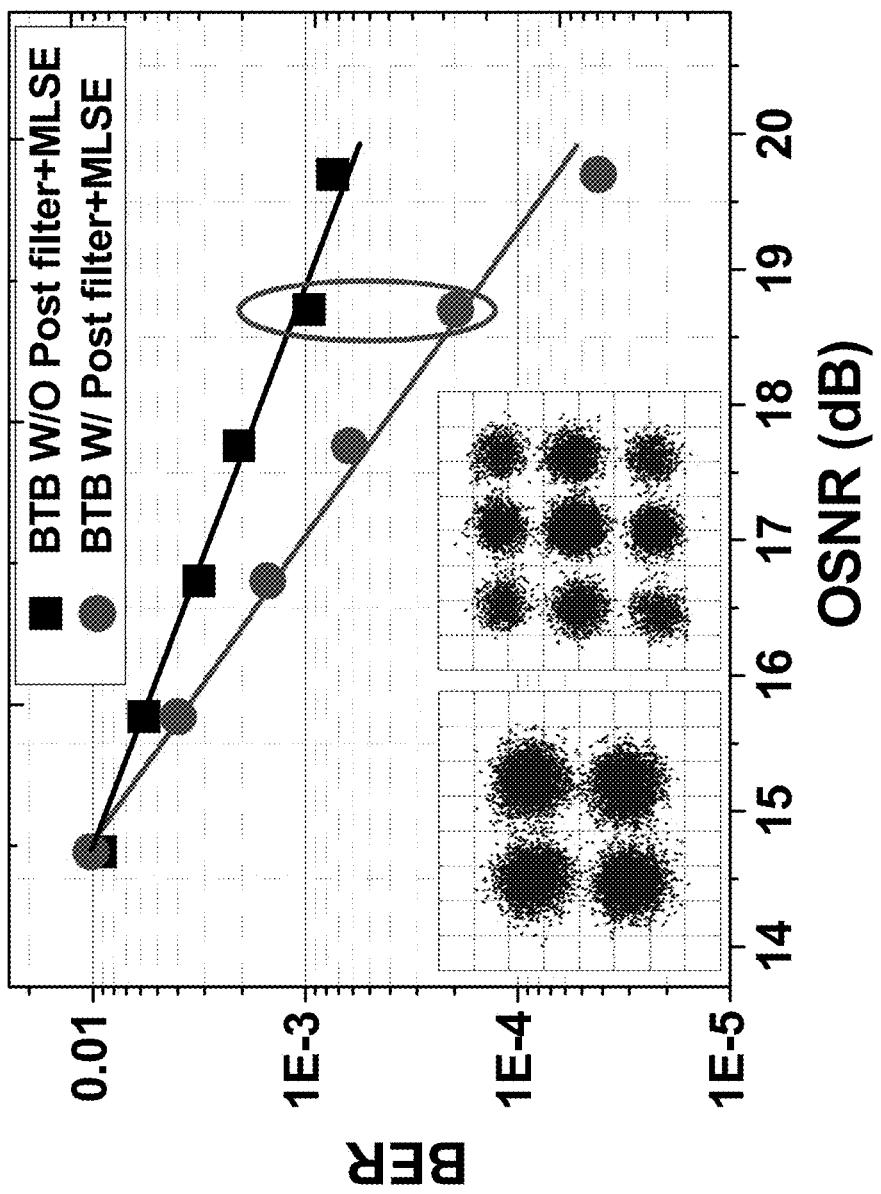
FIG. 10 is a graph comparing the BER performance versus fiber input power for different processing schemes over 1120-km transmission. Inset (i), (ii) and (iii) show the X-polarization constellations at 4.23-dBm input power/channel under the processing of joint-channel CDC only, SC-CS-DBP(4) and JC-LS-DBP(4), respectively.

FIG. 10 shows an example of the BER performance of channel 2 varying with the input power into each span after 1120-km SMF-28 transmission with different processing schemes, including single channel CDC only, joint-channel CDC only, single channel NLC/CDC based on constant and logarithmic step size DBP (SC-CS-DBP, SC-LS-DBP), and joint-channel NLC/CDC based on constant and logarithmic step size DBP (JC-CS-DBP, JC-LS-DBP). The input power is simultaneously changed for each span. In order to keep the transmission in the nonlinear region, the input power is set from 3.23-dBm/channel to 6.23-dBm/channel. For single-channel CDC or NLC/CDC, the channel 2 is first de-multiplexed from the three channels and then processed by the single-channel NLC with only channel 2, which is the single channel signal processing. However, for joint-channel NLC and CDC, the three channels are first compensated together and then de-multiplexed, processed as shown in FIG. 1B. The results show that the CDC-only schemes for both single-channel and joint-channel cases have the worst BER performance after transmission. The single-channel NLC/CDC schemes based on CS-DBP or LS-DBP show limited BER performance improvement. Both JC-CS-DBP and JC-LS-DBP show better performance compared with single channel schemes, since the joint-channel NLC can handle both intra-channel and cross-channel nonlinear impairments between channels. The logarithmic step size distribution schemes show better performances compared with constant step size schemes in both single-channel and joint-channel processing. Inset (i), (ii) and (iii) show the X-polarization constellations at 4.23-dBm input power/channel under the processing of joint-channel CDC only, SC-CS-DBP (with 4-steps) and JC-LS-DBP (with 4-steps), respectively. An obvious constellation improvement under NLC by using JC-LS-DBP is apparent from the figure. In this way, the JC-LS-DBP method shows the best performances among all the NLC processing schemes. Compared with CDC only processing and regular SC-CS-DBP, the input power per channel for BER at 1×10−3 under the JC-LS-DBP method can be improved about 3 dB and 2 dB, respectively.

Figure 11:
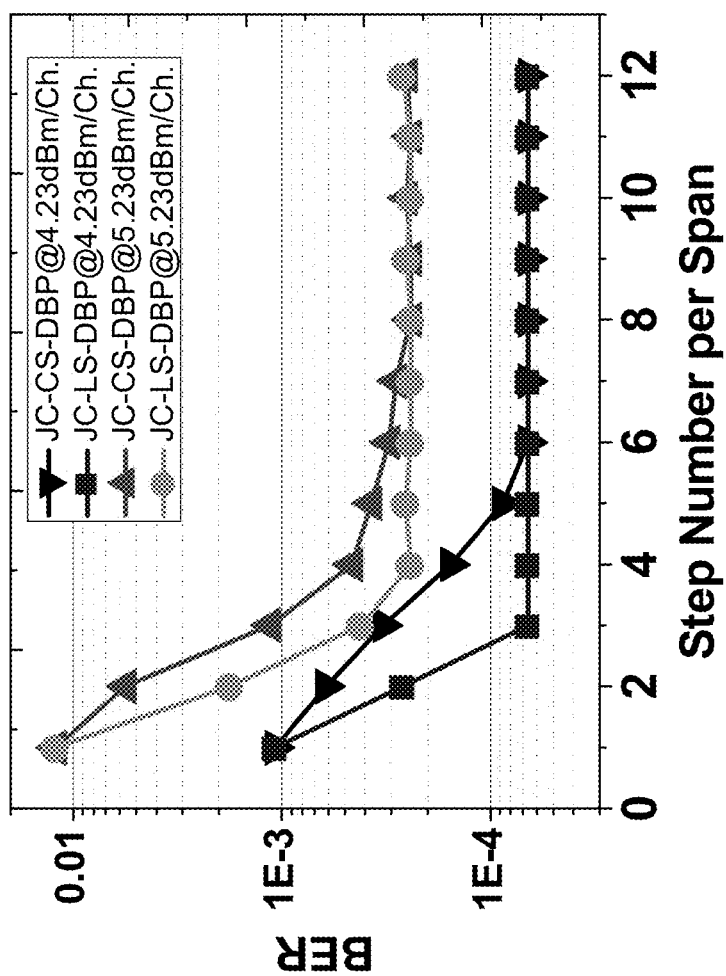
FIG. 11 is a graph comparing the BER performance for different NLC schemes versus the calculation step number per span with different input power.

Considering the computation complexity, FIG. 11 shows the BER performance for joint-channel DBP with constant and logarithmic step size versus the calculation step number per span with different input power after 1120-km transmission. The adjusting factor k is kept at 0.4. We can see that the optimal step number used in LS-DBP can be reduced to nearly half of that in CS-DBP. For 5.23-dBm input power per channel case, the optimal step number is 4 for LS-DBP, while the optimal step number is about 8 for CS-DBP. Therefore, the computation complexity of LS-DPB can be significantly reduced compared with CS-DBP method. For small step number calculation, the LS-DBP method shows better performance compared with CS-DBP under both input power. Also, the optimal step number of lower input power (4.23-dBm per channel) is less than that of higher input power (5.23-dBm per channel) for both CS and LS DBP methods, since more steps are required for higher launch power.

Figure 12:
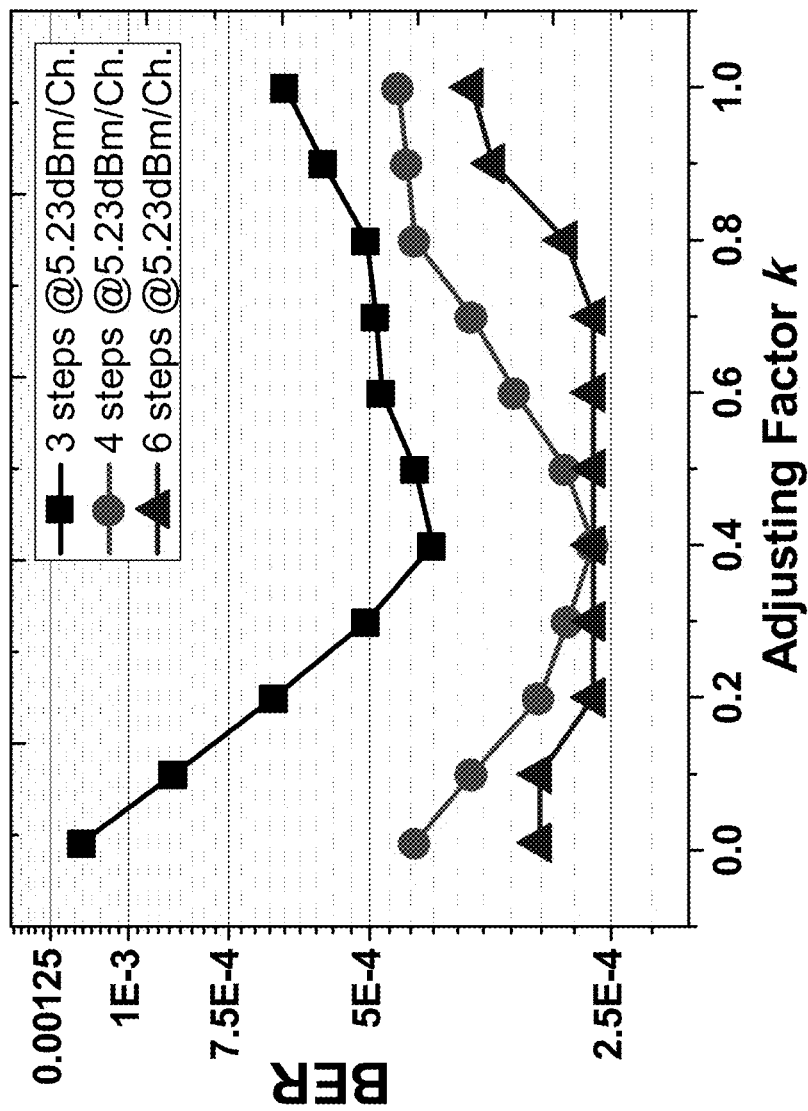
FIG. 12 is a graph comparing the BER performance of JC-LS-DBP versus the adjusting factor k with different calculation step number.

The adjusting factor k can be changed from 0.01 to 1 in the JC-LS-DBP calculation to investigate the impact of logarithmic step size distribution on the BER performance under different step numbers. FIG. 12 shows the BER performance of JC-LS-DBP method versus the adjusting factor k with different calculation step number. The input power per channel is set at 5.23 dBm. The k factor affects the BER results for different calculation numbers, especially for smaller calculation step number. The adjusting factor k has less effect for larger calculation step number. As shown in FIG. 12, the optimal adjusting factor k is around 0.4 with the best BER performance.

Figure 14:
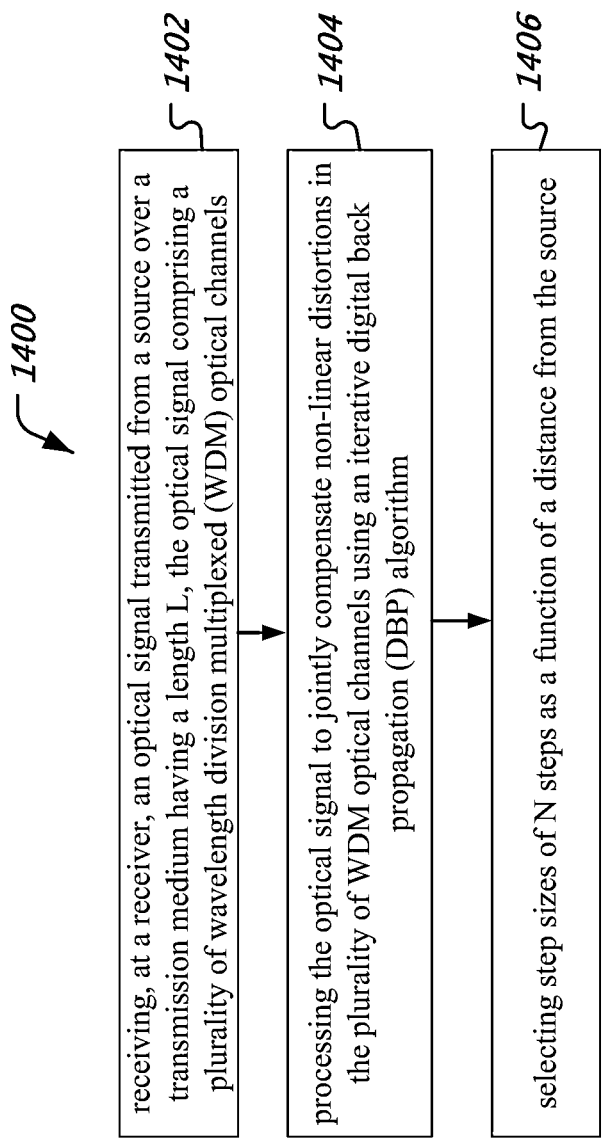
FIG. 14 is a flowchart representation of a process of optical communication.

FIG. 14 is a flowchart representation of an optical signal processing procedure 1400. The procedure 1400 may, e.g., be implemented in an optical transceiver equipment 106.

At 1402, an optical signal transmitted from a source over a transmission medium having a length L is received at a receiver. As previously discussed with respect to FIG. 1, the optical signal may include a plurality of wavelength division multiplexed (WDM) optical channels. Each channel may use a different optical modulation scheme (QPSK or QAM) and constellation. In various embodiments, the length L may be, e.g., several kilometers to hundreds of kilometers (e.g., 100 km).

At 1404, the optical signal is processed to jointly compensate non-linear distortions in the plurality of WDM optical channels using an iterative digital back propagation (DBP) algorithm by dividing the length L into N steps, where N is an integer and where operation of the DBP algorithm at each step is controlled by a corresponding step size of the step. As previously described with respect to Equations (1) to (3), in some implementations, the step sizes of each step is inversely proportional to an attenuation adjusting parameter (e.g., k).

At 1406, step sizes of N steps are selected as a function of a distance from the source such that for a first set of contiguous steps starting from the receiver and extending towards the source, selected step sizes have values greater than L/N and less than values from logarithmic step size assignments and for remaining steps not in the first set, selected step sizes have values smaller than L/N and greater than values from logarithmic step size assignments. As discussed with respect to FIG. 3, e.g., the k parameter can be selected to achieve this mathematical property. In some implementations, a different k value may be selected for each step. In some implementations, the k value may be selected from the closed interval [0.3, 0.7]. In some implementations, the k value is selected to be equal to 0.4.

In some implementations, after the non-linear degradation in the optical signal is compensated, the received compensated optical signal can be demodulated and modulated data can be recovered using one of several demodulation techniques.

Figure 15:
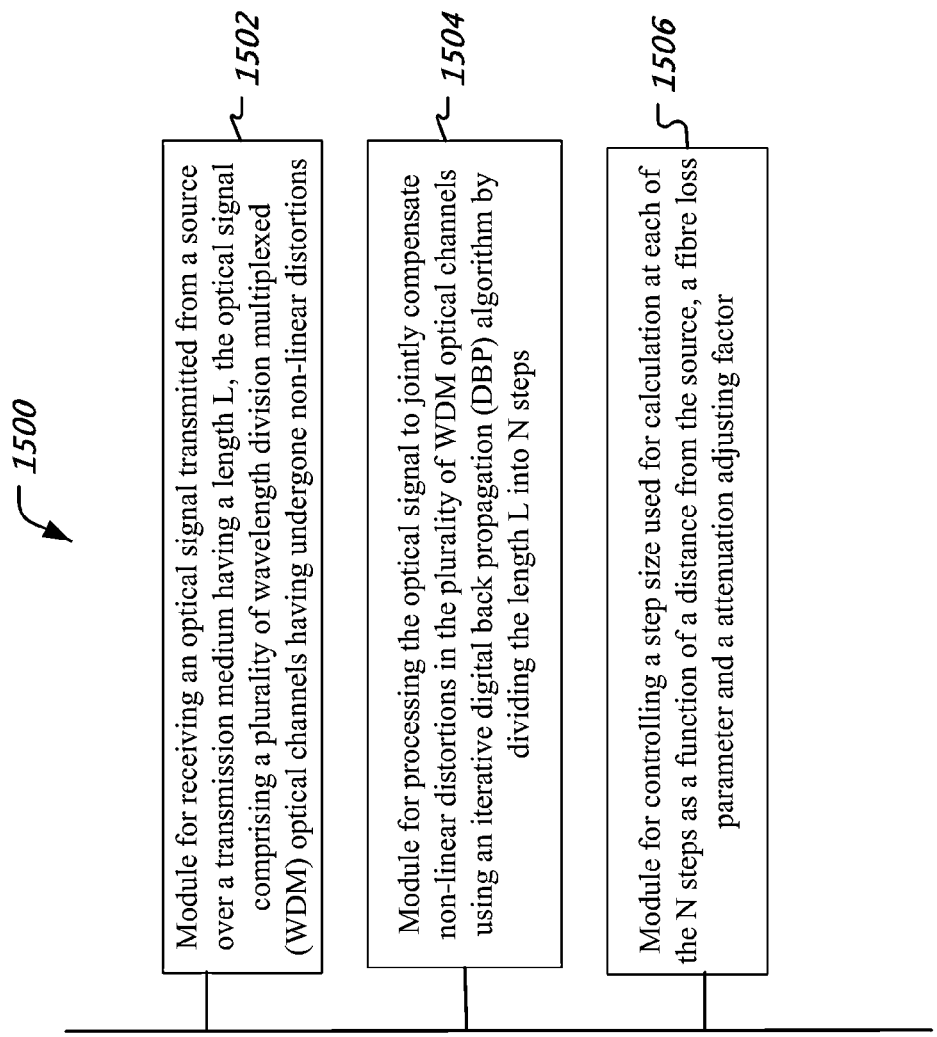
FIG. 15 is a block diagram representation of an optical communication receiver apparatus.

FIG. 15 is a block diagram representation of an apparatus 1500 for optical signal processing. The module 1502 is for receiving an optical signal transmitted from a source over a transmission medium having a length L, the optical signal comprising a plurality of wavelength division multiplexed (WDM) optical channels having undergone non-linear distortions.

The module 1504 is for processing the optical signal to jointly compensate non-linear distortions in the plurality of WDM optical channels using an iterative digital back propagation (DBP) algorithm by dividing the length L into N steps. Various techniques for implementing DBP have been discussed previously in this document.

The module 1506 is for controlling a step size used for calculation at each of the N steps as a function of a distance from the source, a fibre loss parameter and a attenuation adjusting factor that has a constant value. For example, as previously described with respect to equations (1) to (3), a closed-form expression can be used to derive step sizes from the above-described operational parameters.

One of skill in the art will appreciate that a JC-NLC for NWDM system based on the optimal logarithmic step size is disclosed. The sub-channels in NWDM system are more compact in bandwidth which enables the multi-channel coherent detection. Different from regular constant step size, we use the logarithmic non-constant step size distribution in DBP with reduced complexity and improved performance. The optimal logarithmic step size distribution is studied and obtained by introducing an attenuation adjusting factor k. Simulation and experiment results shows the optimal k factor is around 0.4 (e.g., between 0.3 and 0.7). Compared with individual-channel constant step nonlinear compensation, the improved BER performance and Q-value for our scheme is demonstrated by 3×50-Gb/s NWDM PDM-QPSK signal with 1120-km SMF-28 transmission with EDFA-only amplification.

In some embodiments, a memory is used to store instructions that, when executed by a processor, cause the processor to control a receiver to receive an optical signal transmitted from a source over a transmission medium having a length L. The optical signal comprises a plurality of wavelength division multiplexed (WDM) optical channels having undergone non-linear distortions. The processor further is caused to control a distortion processor that processes the optical signal to jointly compensate non-linear distortions in the plurality of WDM optical channels using an iterative digital back propagation (DBP) algorithm by dividing the length L into N steps. The processor can further control a step size used for calculation at each of the N steps as a function of a distance from the source, a fibre loss parameter and a attenuation adjusting factor that has a constant value.

In some implementations, an optical communication system includes an optical transmitter that transmits a wavelength division multiplexed (WDM) optical signal comprising a plurality of channels, an optical transmission medium having a length L and an optical receiver that receives the transmission from the optical transmitter over the optical transmission medium and processes the optical signal to jointly compensate non-linear distortions in the plurality of WDM optical channels using an iterative digital back propagation (DBP) algorithm by dividing the length L into N steps and controls a step size used for calculation at each of the N steps as a function of a distance from the source, a fibre loss parameter and an attenuation adjusting factor that has a constant value.

The disclosed and other embodiments, modules and the functional operations described in this document (e.g., an optical receiver, a distortion compensator, a step size controller, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. An optical signal processing method, comprising:
   receiving, at a receiver, an optical signal transmitted from a source over a transmission medium having a length L, the optical signal comprising a plurality of wavelength division multiplexed (WDM) optical channels;
   processing the optical signal to jointly compensate non-linear distortions in the plurality of WDM optical channels using an iterative digital back propagation (DBP) algorithm by dividing the length L into N steps, where N is an integer and wherein operation of the DBP algorithm at each step is controlled by a corresponding step size of the step; and
   selecting step sizes of N steps as a function of a distance from the source such that:
   for a first set of contiguous steps starting from the receiver and extending towards the source, selected step sizes have values greater than L/N and less than values from logarithmic step size assignments, and
   for remaining steps not in the first set, selected step sizes have values smaller than L/N and greater than values from logarithmic step size assignments.

2. The method of claim 1, wherein step sizes are inversely proportional to an attenuation adjusting parameter.

3. The method of claim 2, wherein the attenuation adjusting parameter has a constant value between and including 0.3 and 0.7.

4. The method of claim 2, wherein the constant value is equal to 0.4.

5. The method of claim 1, wherein the selecting further includes using a fibre loss parameter for selecting step sizes.

6. The method of claim 5, wherein an nth step size z(n) is calculated using fibre loss parameter, represented as α, the attenuation adjusting parameter, represented as k, L and N are relates as:

$$z(n) = -\frac{1}{k\alpha}\ln\left[\frac{1-(N-n+1)\delta}{1-(N-n)\delta}\right], n = 1, \ldots, N'$$

wherein $\delta = (1-e^{-k\alpha L})/N$.

7. The method of claim 1, further including:
   demultiplexing the plurality of WDM optical channels into individual optical sub-channels.

8. The method of claim 7, wherein the demultiplexing is performed by digital filtering the optical signal jointly compensated for non-linear distortions.

9. The method of claim 8, further including:
   performing, after the digital filtering, polarization domain demultiplexing in each optical sub-channel.

10. An optical communication apparatus, comprising:
    an optical receiver that receives an optical signal transmitted from a source over a transmission medium having a length L, the optical signal comprising a plurality of wavelength division multiplexed (WDM) optical channels having undergone non-linear distortions;
a distortion compensator that processes the optical signal to jointly compensate non-linear distortions in the plurality of WDM optical channels using an iterative digital back propagation (DBP) algorithm by dividing the length L into N steps; and
a step size controller that controls a step size used for calculation at each of the N steps as a function of a distance from the source, a fibre loss parameter and a attenuation adjusting factor that has a constant value;
wherein the step size is inversely proportional to the constant value of the attenuation adjusting parameter.

11. The apparatus of claim 10 wherein the constant value of the attenuation adjusting parameter is a value between and including 0.3 and 0.7.

12. The apparatus of claim 10 wherein the constant value is equal to 0.4.

13. The apparatus of claim 10, wherein an nth step size z(n) is calculated using fibre loss parameter, represented as $\alpha$, the attenuation adjusting factor, represented as k, L and N are relates as:

$$z(n) = -\frac{1}{k\alpha}\ln\left[\frac{1-(N-n+1)\delta}{1-(N-n)\delta}\right], n = 1, \ldots, N'$$

wherein $\delta = (1-e^{-k\alpha L})/N$.

14. An apparatus, comprising:
a memory for storing instructions; and
a processor that reads the instructions and performs an optical signal processing process in which the processor:
controls a receiver to receive an optical signal transmitted from a source over a transmission medium having a length L, the optical signal comprising a plurality of wavelength division multiplexed (WDM) optical channels having undergone non-linear distortions;
controls a distortion processor that processes the optical signal to jointly compensate non-linear distortions in the plurality of WDM optical channels using an iterative digital back propagation (DBP) algorithm by dividing the length L into N steps; and
controls a step size used for calculation at each of the N steps as a function of a distance from the source, a fibre loss parameter and a attenuation adjusting factor that has a constant value, such that the step size is inversely proportional to the constant value of the attenuation adjusting parameter.

15. The apparatus of claim 14, wherein the constant value of the attenuation adjusting parameter is a value between and including 0.3 and 0.7.

16. The apparatus of claim 14, wherein the constant value is equal to 0.4.

17. The apparatus of claim 14, wherein an nth step size z(n) is calculated using fibre loss parameter, represented as $\alpha$, the attenuation adjusting factor, represented as k, L and N are relates as:

$$z(n) = -\frac{1}{k\alpha}\ln\left[\frac{1-(N-n+1)\delta}{1-(N-n)\delta}\right], n = 1, \ldots, N'$$

wherein $\delta = (1-e^{-k\alpha L})/N$.

18. An optical communication system, comprising:
an optical transmitter that transmits a wavelength division multiplexed (WDM) optical signal comprising a plurality of channels;
an optical transmission medium having a length L; and
an optical receiver that receives the transmission from the optical transmitter over the optical transmission medium and:
processes the optical signal to jointly compensate non-linear distortions in the plurality of WDM optical channels using an iterative digital back propagation (DBP) algorithm by dividing the length L into N steps; and
controls a step size used for calculation at each of the N steps as a function of a distance from the source, a fibre loss parameter and an attenuation adjusting factor that has a constant value, such that the step size is inversely proportional to the constant value of the attenuation adjusting parameter.

19. The system of claim 18, wherein the constant value of the attenuation adjusting parameter is a value between and including 0.3 and 0.7.

20. The system of claim 18, wherein the optical receiver calculates an nth step size z(n) is using fibre loss parameter, represented as $\alpha$, the attenuation adjusting factor, represented as k, L and N are relates as:

$$z(n) = -\frac{1}{k\alpha}\ln\left[\frac{1-(N-n+1)\delta}{1-(N-n)\delta}\right], n = 1, \ldots, N'$$

wherein $\delta = (1-e^{-k\alpha L})/N$.

* * * * *